United States Patent
Su

(10) Patent No.: US 7,779,266 B2
(45) Date of Patent: Aug. 17, 2010

(54) METHOD FOR CONTROLLING PLUGGABLE PORT ON INTERFACE BOARD OF COMMUNICATION DEVICE AND INTERFACE BOARD

(75) Inventor: Changzheng Su, Shenzhen (CN)

(73) Assignee: Huawei Technologies Co., Ltd., Seoul (KR)

( * ) Notice: Subject to any disclaimer, the term of this patent is extended or adjusted under 35 U.S.C. 154(b) by 908 days.

(21) Appl. No.: 11/527,172

(22) Filed: Sep. 26, 2006

(65) Prior Publication Data

US 2007/0077791 A1    Apr. 5, 2007

Related U.S. Application Data

(63) Continuation of application No. PCT/CN2005/000518, filed on Apr. 18, 2005.

(30) Foreign Application Priority Data

Apr. 16, 2004   (CN) ........................ 2004 1 0034521

(51) Int. Cl.
G06F 21/00     (2006.01)
(52) U.S. Cl. ..................... 713/183; 726/16; 726/17; 726/20; 726/34
(58) Field of Classification Search ................ 439/76.1; 713/183; 726/20, 34, 16, 17
See application file for complete search history.

(56) References Cited

U.S. PATENT DOCUMENTS 5,402,492 A    3/1995  Goodman et al. ............. 726/20
5,931,948 A    8/1999  Morisawa et al. ............. 726/19
6,032,256 A    2/2000  Bernard ....................... 726/34
6,138,240 A *  10/2000 Tran et al. .................... 726/19
6,912,663 B1*  6/2005  Dayan et al. .................. 726/16
2003/0172295 A1  9/2003  Jones
2004/0003262 A1* 1/2004  England et al. ............. 713/189

FOREIGN PATENT DOCUMENTS

CN    1357840    7/2002
CN    1358044    7/2002

OTHER PUBLICATIONS

International Search Report for PCT/CN2005/000518, mailed Jul. 14, 2005.
Written Opinion for PCT/CN2005/00518, mailed Jul. 14, 2005.
Supplementary European Search Report for Application No. 05745099, dated Jul. 21, 2009.

* cited by examiner

*Primary Examiner*—Thanhnga B Truong
(74) *Attorney, Agent, or Firm*—Brinks Hofer Gilson & Lione

(57) ABSTRACT

A method for controlling a pluggable port on an interface board of a communication device, pre-setting; the process of controlling the port includes: the communication device receiving an external inputted password and verifies the received password according to a pre-set password; the communication device enables or disables the pluggable port according to the verification result. Also disclosed is an interface board with a pluggable port, the line(s) connecting with the pluggable module includes one or more switches, after verification by the above-mentioned method, control the pluggable port on the interface board to be enabled or disabled by controlling the switch(es) according to the verification result. The present invention can efficiently avoid the false or illegal use of the pluggable ports of the interface board, thereby guaranteeing the stability and reliability of the communication device and the communication network.

16 Claims, 12 Drawing Sheets

METHOD FOR CONTROLLING PLUGGABLE PORT ON INTERFACE BOARD OF COMMUNICATION DEVICE AND INTERFACE BOARD

CROSS-REFERENCES TO RELATED APPLICATIONS

This is a continuation of International Application No. PCT/CN2005/000518, which was filed on Apr. 18, 2005, and which, in turn, claimed the benefit of Chinese Patent Application No. 200410034521.5, which was filed on Apr. 16, 2004, the entire disclosures of which are hereby incorporated herein by reference.

BACKGROUND OF THE DISCLOSURE

1. Field of the Technology

The present invention relates to single boards of communication devices. More particularly, the invention relates to a method for controlling pluggable ports on an interface board of a communication device and a kind of interface board.

2. Background of the Invention

At present, a communication device is generally composed of all sorts of single boards such as system control boards, cross boards, interface boards, power supply boards, etc. Wherein, the system control board is mainly responsible for control and management of other single boards, the system control board can be connected to a network management device and perform management functions, e.g. system configuration, via input/output devices of the network management devices, e.g. keyboards and displays. The cross board is connected with the system control board and the interface board, and is used for scheduling data input from the interface board, and after scheduling the data, the cross board outputs the data to the designated interface board, and the cross board is further used for executing commands of the system control board and returning relative information to the system control board. The interface board is connected with the system control board and the cross board, and is mainly used for inputting/outputting services, and performing a protocol processing to the services, and switching data with the cross board, executing the commands of the system control board and returning relative information to the system control board. The power supply board is used for supplying each single board with power. It can be seen that the capacity of the communication device is embodied through the number of the interface boards and the number of input/output interfaces on each interface board.

In recent years, due to the improvement of the requirement of users along with the rapid development of communication technologies, the demand on functions and capacities of the communication devices becomes higher and higher, which leads to more and more interface boards and ports in a single device, and the structure of the communication device becomes more and more complicated.

FIG. 1 is a schematic diagram illustrating the structure of the interface board in the related art. As shown in FIG. 1, the interface board includes multiple input/output ports 101, a multiplexer/demultiplexer 102, which is optional, a protocol processing module 104, a logical control module 105, a CPU processing unit 106, a memorizer 107, and a clock processing module 108. The interface board can communicate with the system control board or/and other single boards of the device through the bus of the CPU Processing unit 106.

With the increase in the number of the ports in single interface board, in practical applications, besides the interface board is required to be pluggable, the ports of the interface board are also required to be pluggable, accordingly, each pluggable port needs a module. Under such circumstances, a 10 Gigabit Small Form Factor Pluggable Module (abbreviated as XFP), a Small Form-factor Pluggable Transceiver (abbreviated as SFP) and a 10 Gigabit Ethernet Transceiver Package (abbreviated as XENPAK) have been developed successively, and all these modules are pluggable. FIG. 2 is a structural schematic diagram illustrating the internal functions of the pluggable module. As shown in FIG. 2, the above-mentioned pluggable module mainly includes a controller 200, a transmitter 210 and a Receiver 220. Wherein, the transmitter 210 consists of an encoding and multiplexing unit 211, which is optional, a driving unit 212 and an electronic/optical unit 213; the Receiver 220 consists of a decoding and demultiplexing unit 221, an amplifying unit 222 and an optical/electronic unit 223.

The rough structure of the interface board and pluggable module according to the related art has been described above, referenced in FIG. 3. Hereinafter the pluggable ports on the interface board will be accordingly illustrated. FIG. 3 is a structural diagram illustrating a typical circuit of the pluggable port on the interface board according to the related art. As shown in FIG. 3, the pluggable port mainly includes a connector 300, a power supply VCC, inductors L1 and L2, capacitors C1, C2 and C3, a multiplexer/demultiplexer 303, a logical control unit 305, a CPU 306, a protocol processor 304, and a resistors R1, R2 and R3.

Wherein, the Connector 300 is used for connecting the pluggable module and other parts of the pluggable module; the Power Supply VCC is used for supplying the pluggable module with power; the inductors L1 and L2, the capacitors C1, C2 and C3 are used for power filter; the multiplexer/demultiplexer 303 is used for combining multiple lines of low-rate data into one line of high-rate data and dividing one line of high-rate data into multiple lines of low-rate data in the reverse direction, herein it needs to be explained that the multiplexer/demultiplexer 303 is optional; the logical control unit 305 is used for detecting and controlling the logical states of the pluggable module, the multiplexer/demultiplexer 303 and the protocol processor 304; the CPU 306 is used for controlling the logical control unit 305 and the protocol processor 304; the protocol processor 304 is used for processing the input/output data; the Resistor R1 cooperates with Pins D and E of the logical control unit 305 and the in-position detection line of the pluggable module, and they are used for detecting whether the pluggable module is in-position. When the pluggable port of the interface board works, as shown in FIG. 3, the Pin D of the logical control unit 305 outputs a high level, the Pin E of the logical control unit 305 detects the state of the input voltage level, if the high level is detected, it indicates that the pluggable module is not-in-position. After the pluggable module is plugged-in, the in-position detection line of the pluggable module will lower the voltage level, and the Pin B of the logical control unit 305 will detect the input voltage level is the low level, which indicates the pluggable module is in-position.

In FIG. 3, each port has a set of R1, L1/L2, C1, C2 and C3. All the ports share one CPU 306, one logical control unit 305 and one or more than one protocol processor 303, and each protocol processor 303 can process one or more than one interface service. Under the circumstances of multiple ports, if one protocol processor 303 is not adequate, more than one protocol processor 303 can be adopted. Generally, the port does not need a clock processing module, so there is no clock processing module in FIG. 3.

It could be seen from FIG. 3, in the related art, the control of the pluggable module is mainly implemented by the logical control unit, and the interior structure of the logical control unit is shown in FIG. 4. FIG. 4 is a schematic diagram illustrating the functional structure and connective relations of the logical control unit according to the related art. The logical control unit 400 includes: an interface module 401, a protocol processor Control detecting module 402, a multiplexer/demultiplexer control detecting module 403, a transmitter shutdown control module 404, an alarm receiving module 405, an In-position detecting module 406 and a serial control module 407.

Wherein, the interface module 401 receives commands from the CPU 420, sends the commands to the other functional modules, and receives the information from other functional modules and returns the information to the CPU 420.

The protocol processor control detecting module 402 performs the control and the detection to the protocol processor 410 according to the commands from the interface module 401, and returns the results of the control and the detection to the CPU 420 through the interface module 401.

The multiplexer/demultiplexer control detecting module 403 performs the control and the detection to the multiplexer/demultiplexer according to the commands from the interface module 401, and returns the results of the control and the detection to the CPU 420 through the interface module 401.

The transmitter shutdown control module 404 sets the transmitter shutdown control signal as valid or invalid according to a command from the interface module 401. At present, one function of the CPU 420 is to send a command to the logical control unit 400 to implement the transmitting shutdown control of the transmitter of the pluggable module to according to the demand of service. The CPU 400 has very powerful functions, it is the control centre of the whole single board, not only controlling the logical control unit 420; other functions are not mentioned herein due to their limited relevance to the present invention.

The alarm receiving module 405 receives the alarm information, e.g. a laser failure alarm, a receiver signal loss alarm, etc., from the pluggable module, and transmits the alarm information to the CPU 420 through the interface module 401.

The In-position detecting module 406 receives the in-position detection signals from the pluggable module, and detects whether the pluggable module is in-position, and transmits the detection results to the CPU 420 through the interface module 401.

The serial controlling module 407 transmits serial clock signals to the pluggable module according to the commands from the interface module 401, and transmits serial data with the pluggable module.

SUMMARY OF THE INVENTION

The present invention provides a method for controlling a pluggable port on an interface board of a communication device to avoid the pluggable port on the interface board from being falsely or illegally used.

The present invention also provides an interface board with a pluggable port, which will not be falsely or illegally used.

A method for controlling the pluggable port of the interface board of the communication device, including the following steps: pre-setting a password for the pluggable port of the interface board; the communication device receiving an external inputted password and verifying the received password according to pre-set password during working hours; the communication device enabling or disabling the pluggable port of the interface board according to the verification result.

The present invention provides an interface board with a pluggable port, includes at least: a CPU, a memorizer, a logical control unit, at least one kind of port line(s) connecting with a pluggable module, wherein, the memorizer stores a pre-set password of the pluggable port; the CPU receives an external inputted password from the system control board, and verifies the received password by the stored password in the memorizer, and sends a command to enable or disable the interface board to the logical control unit according to the verification result; the logical control unit enables or disables the pluggable port according to the command from the CPU.

It can be seen from the technical solution that, by setting password for the pluggable port of the interface board and setting the state of the pluggable port to be disabled, the present invention can limit the use and replacement of the pluggable port, and the pluggable port of the interface board in the present invention is allowed to be enabled only when the password is correctly inputted. In addition, the present invention implements the management of enabling and disabling the pluggable port by adding one or more than one switch in the pluggable port of the interface board and through the control of the logical control unit.

Therefore, the present invention can better prevent the pluggable port from being falsely or illegally used, avoid the instability and unreliability of the communication device and the communication network resulting from the false or illegal use, and guarantee the normal operation of the communication device and communication network.

DETAILED DESCRIPTION OF PREFERRED EMBODIMENTS

The present invention will be described in detail hereinafter with reference to the accompanying embodiments and drawings to make the technical solution and advantages of the present invention clearer.

The method for controlling the pluggable port of the interface board of the communication device and the interface board is to pre-set a password for the pluggable port of the interface board to limit the use and replacement of the pluggable port. In this method, the pluggable port of the interface board is allowed to be enabled only when the password is correctly inputted.

The method for controlling the pluggable port is to pre-set a password for the pluggable port of the interface board; the process of controlling the pluggable port of the interface board includes:

the communication device receiving an external inputted password and verifying the received password according to pre-set password during working hours;

the communication device enabling or disabling the pluggable port of the interface board according to a verification result.

In the present invention, it is feasible to set one respective password for each pluggable port; or set one share password for multiple pluggable ports; or set multiple corresponding passwords for one pluggable port.

Specifically, there are two implementations for the technical solution: one of them does not change the hardware structure of the interface board, in which the logical control unit sets the input voltage level of the transmitter shutdown control module after the password verification is passed, to control the pluggable port. The other is to add switch(es) on the port line(s) connecting with the pluggable module, and to control the pluggable port through controlling the switch(es) by the logical control unit after the password verification is passed.

Hereinafter the present invention will be described in detail with reference to three preferable embodiments.

The First Preferable Embodiment:

The present embodiment adopts the first implementation method as mentioned above. The control process of the embodiment includes: a process of setting the password, a control process when detecting a pluggable module is plugged-in, and a process of configuring the pluggable port.

Figure 5:
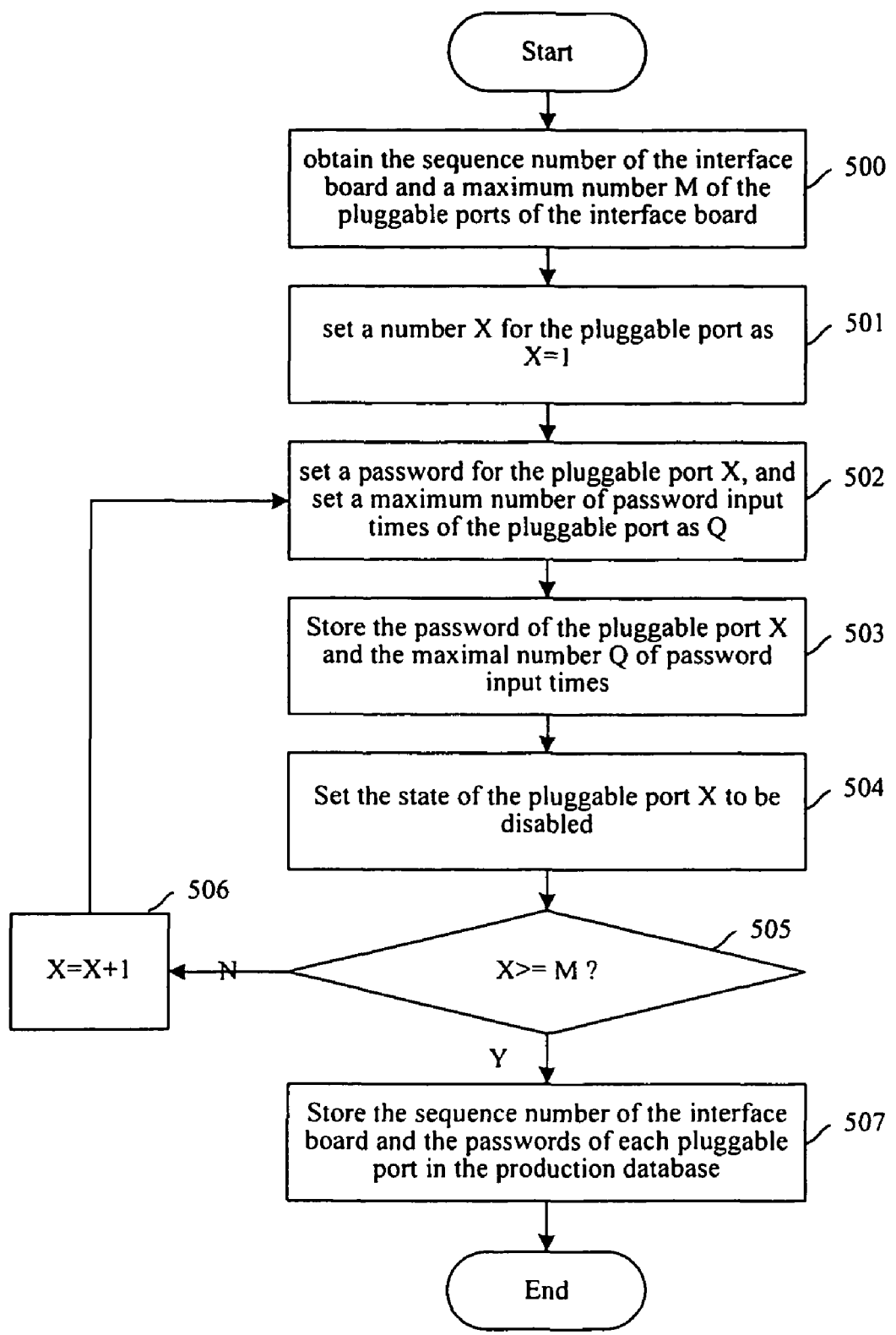
FIG. 5 is a flow chart illustrating a procedure of setting password(s) according to a first preferable embodiment of the present invention.

Firstly, the process of setting the password will be illustrated. The present embodiment sets one respective password for each pluggable port. The process of setting the passwords is implemented during manufacture; a simple method is: setting an upper limit for the number of the pluggable ports that the interface board can hold, then setting one password for each pluggable port and storing the password in the memorizer of the interface board, then setting the states of the pluggable ports to be disabled and correspondingly storing the sequence number of the interface board and the pre-set passwords into the manufacture database. The detailed process is shown in FIG. 5, which is a flowchart illustrating a process of setting the passwords according to the first preferable embodiment of the present invention, including the following steps:

Step 500: Obtain the sequence number of the interface board and a maximum number M of the pluggable ports of the interface board.

Step 501: Select a pluggable port, and set a number X for the pluggable port as X=1.

Step 502: Set a password for the pluggable port whose number is X (referred to as pluggable port X hereinafter), and set a maximum number of password input times of the pluggable port as Q.

The maximum number Q of password input times denotes the allowable times to input incorrect passwords, if the input times exceeds the maximum number Q of password input times, the system will not allow the user to change the state of the pluggable port any more, which will be described in detail hereinafter.

Step 503: Store the password of the pluggable port X set in step 502 and the maximum number Q of password input times of the pluggable port in the memorizer inside the interface board.

Step 504: Set the state of the pluggable port X to be disabled, i.e. any pluggable module plugged in this port cannot work normally.

Step 505: Determine whether the pluggable port number X is larger than or equal to the maximum pluggable port number M of the interface board, if X is larger than or equal to M, it indicates that all the pluggable ports on the interface board have been set with passwords and the disabled states, execute step 507; otherwise, it indicates that the settings have not been implemented on at least one pluggable port, execute step 506, and then return to step 502 to go on with the settings.

Step 506: Set the number X of the pluggable port as X=X+1;

Step 507: Correspondingly store the sequence number of the interface board and the passwords of the pluggable ports into the manufacture database.

The manufacture database is used for recording a serial of data generated during the production of devices and their single boards, e.g. device configurations, single board information, etc. The manufacture database is a database used for storing the data of production process of device vendors.

In the present embodiment, store the pre-set passwords of the pluggable ports and the sequence number of the interface board into the manufacture database correspondingly; legal users can obtain the passwords of the pluggable ports of the interface board from the manufacture database through networks according to the sequence number of the interface board.

Wherein, the sequence number is also known as a serial number, which is the only identifier of the interface board; in general, the serial number is stuck on the handle plate of the interface board in a format of bar code, and the bar code contains such information as type, production time and serial number of the interface board.

Then, when detecting any pluggable module is plugged-in, the control process will be illustrated thereafter.

Figure 6:
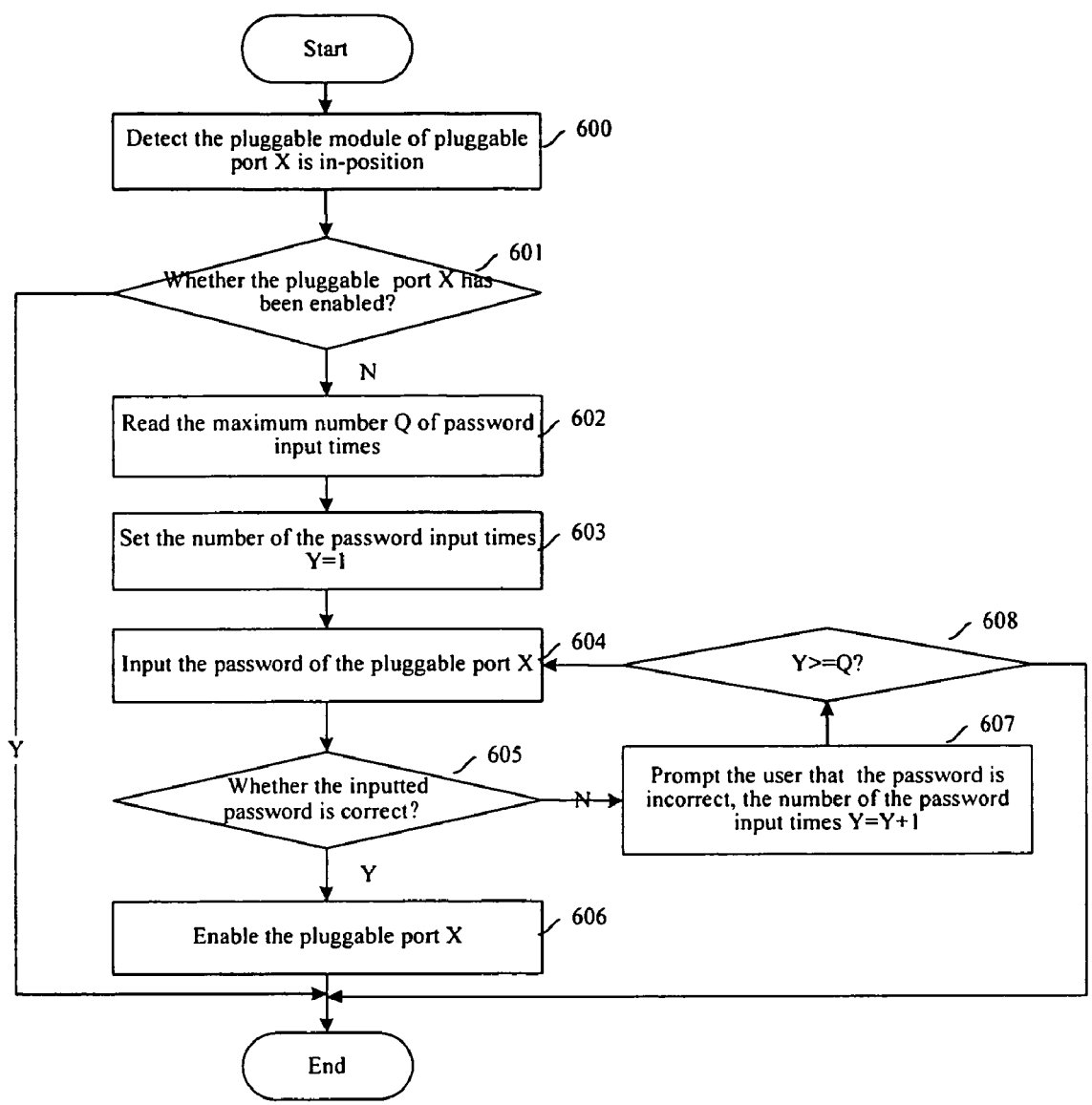
FIG. 6 is a flow chart illustrating a procedure when the interface board detects the pluggable module is plugged-in according to the embodiment shown in FIG. 5.

In a word, when detecting a pluggable module is plugged-in, determine whether the state of the pluggable port is enabled, if the state is enabled, directly end the process; otherwise, prompt the user to input the password, after verifying the password, set the state of the pluggable port to be enabled or disabled according to the verification result. The detailed process is shown in FIG. 6 which is a flowchart illustrating the control when the interface board detects a pluggable module is plugged-in according to the embodiment shown in FIG. 5. The process includes:

Step 600: During the working hours of the communication device, the interface board detects the pluggable module of the pluggable port X is in-position when the pluggable module is plugged in the pluggable port of the interface board.

Step 601: Determine whether the state of the pluggable port X is enabled, if the state is enabled, directly end the process without any operation; otherwise, it indicates that the pluggable port X has not been enabled, execute step 602.

Wherein the determination process can be: setting a state indicator in software, and determining whether the state is enabled by reading the value of the indicator. The determination process can also be: determining whether the input voltage level of the transmitter shutdown control module is valid, if it is valid, the state of the pluggable port X is enabled.

Step 602: Obtain the maximum number Q of password input times, as mentioned above, the maximum number Q of password input times has been set and stored in the memorizer of the interface board in the process of setting the password.

Step 603: Set a number of password input times Y as Y=1.

Step 604: Input the password of the pluggable port X.

In this step, the system will pop up a dialog box prompting the user to input the password, specifically: the interface board informs the system control board of the communication device when detecting that a pluggable module is plugged-in, and the system control board pops up a dialog box prompting the user to input the password through a display connecting with it. The system control board sends the password to the interface board after the user inputs the password.

Step 605: The interface board determines whether the inputted password of the pluggable port X is correct according to the password of the pluggable port X stored in the memorizer of the interface board, if it is correct, go to step 606; if the password is incorrect, i.e. the password verification is not passed, go to step 607.

Wherein, the determination can be made through simply judging whether the two passwords are identical. If the inputted password is identical with the stored password, the verification is passed.

Step 606: Enable the pluggable port X, modify the state of the pluggable port X as enabled, and reset the number of password input times as 0, end the procedure.

Step 607: The system pops up an information box to prompt that the inputted password is incorrect, and sets the number of password input times Y as Y=Y+1.

Step 608: Determine whether the number of the password input times is larger than or equal to the maximum number Q of password input times which is set in the procedure of setting the password and the disabled state, according to the number of password input times, if it is larger than or equal to Q, it indicates that the number of the input times of the incorrect password has reached the upper limit and the system forbids the use of the pluggable module, end the procedure. Otherwise, return to step 604, i.e. input the password of the pluggable port X again.

The procedure shown in FIG. 6 implements the procedure of enabling the pluggable port through inputting the correct password of the pluggable port, and meanwhile, forbidding the user who successively inputs incorrect passwords to falsely or illegally use the pluggable port of the interface board.

Figure 7:
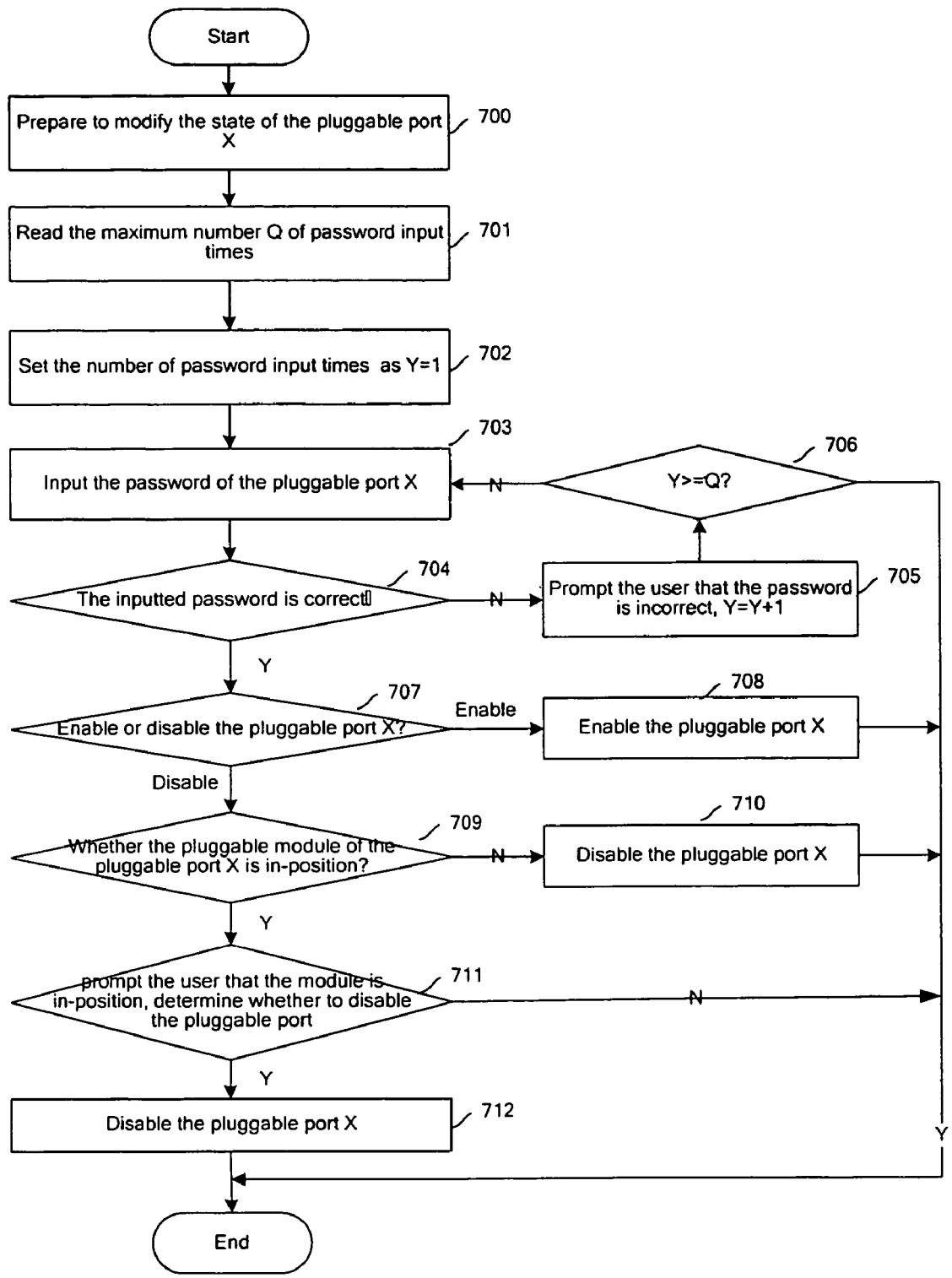
FIG. 7 is a flow chart illustrating a state configuration of the pluggable port of the interface board according to the embodiment shown in FIG. 5.

At last, the procedure of setting the state of the pluggable port when configuring the pluggable port will be illustrated. When using the interface board, no matter whether there is a pluggable module in the pluggable port, the state of the pluggable port can be configured to be enabled or disabled. The procedure is shown in FIG. 7, which is a flowchart illustrating the state configuration of the pluggable port of the interface board according to the embodiment shown in FIG. 5. The procedure includes the following steps:

Step 700: Prepare to modify the state of the pluggable port X on the interface board. The user can select the pluggable port X to be configured through the input/output device of the system control board.

Step 701: Read the maximum number Q of password input times from the memorizer, the maximum number Q of password input times has been set in the step of setting the password and the disabled state as mentioned above.

Step 702: Set the number Y of the password input times as Y=1.

Step 703: Input the password of the pluggable port X. wherein the procedure of inputting the password is the same as that in step 604, which will not be repeated herein.

Step 704: Determine whether the inputted password is correct according to the password of the pluggable port X which is set and stored in above mentioned procedure, if it is correct, go to step 707; otherwise, go to step 705.

Step 705: The system prompts that the password is incorrect, and sets the number Y of the password input times as Y=Y+1.

Step 706: Determine whether the number Y of the password input times is larger than or equal to the maximum number Q of password input times, if Y is larger than or equal to Q, it indicates that the number of the input times of the incorrect password has reached the upper limit, directly end the procedure; otherwise, return to step 703, and input the password of the pluggable port X again.

Step 707: Determine whether to enable or disable the pluggable port X, if the pluggable port X is to be enabled, go to step 708 to enable the pluggable port X, and end the procedure; otherwise, go to step 709.

Step 709: Determine whether the pluggable module of the pluggable port X is in-position, if it is not-in-position, go to step 710 to disable the pluggable port X; otherwise, go to step 711.

Step 710: The system prompts the user that the pluggable module of the pluggable port X is in-position and prompts the user to confirm whether to disable the pluggable port X. If the user does not confirm to disable the pluggable port X, end the procedure; if the user confirms to disable the pluggable port X, go to step 712 to disable the pluggable port X and then end the procedure.

In the procedure shown in FIG. 7, the state of the pluggable port can be set to be enabled or disabled through inputting the correct password, and the false or illegal uses can be avoid.

The Second Preferable Embodiment:

The present embodiment also adopts the first implementation method. In this embodiment, set one share password for multiple pluggable ports, i.e. each pluggable port is not uniquely corresponding to the password, one password controls at least one pluggable portIn addition to the procedure of setting the password, the control procedure when detecting that a pluggable module is plugged-in and the setting procedure when configuring the pluggable port, the control procedure of the embodiment further includes: a process of enabling the pluggable ports of the interface board and a process of modifying the number of the pluggable port that the password allows to enable.

Firstly, the procedure of setting the password will be illustrated.

Figure 8:
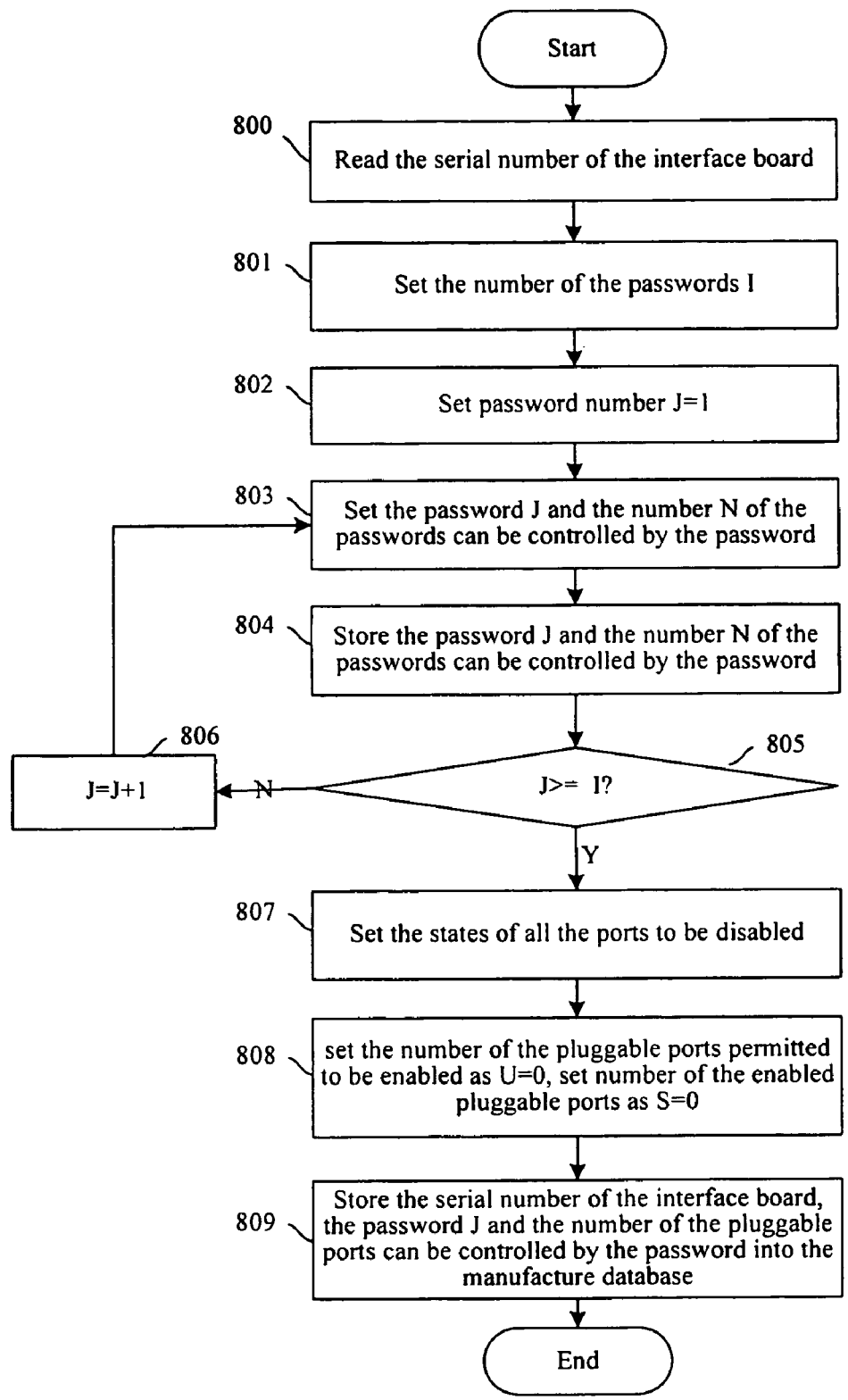
FIG. 8 is a flow chart illustrating a procedure of setting password(s) according to a second preferable embodiment of the present invention.

The procedure of setting one share password for multiple pluggable ports is also implemented during the production. The simple method is: setting the number of the passwords and setting each password, then setting the number of the pluggable ports controlled by each password and storing the passwords in the memorizer of the interface board, and then setting the states of all the pluggable ports of the interface board to be disabled and correspondingly storing the serial number of the interface board, the group of the passwords and the number of the pluggable ports that can be controlled by each password into the manufacture database. Referring to FIG. 8 for the detailed process, FIG. 8 is a flow chart illustrating a procedure of setting the password according to the second preferable embodiment of the present invention. The procedure includes the following steps:

Step 800: Read the serial number of the interface board.

Step 801: Set the number of the passwords of the interface board, I, i.e. the total number of the passwords of the interface board.

Step 802: Set a password number J as J=1.

Step 803: Set the password whose password number is J, and set the number N of the pluggable ports that can be controlled by the password, i.e. the total number of the pluggable ports can be controlled by the password whose password number is J.

Step 804: Store the above-mentioned password whose password number is J and the number N of the pluggable ports that can be controlled by the password into the memorizer in the interface board.

Step 805: Determine whether the password number J is larger than or equal to the number of the passwords I, if J is larger than or equal to I, execute step 807; otherwise, execute step 806.

Step 806: Add the password number J by one, i.e. set password number J as J=J+1, return to step 803.

Step 807: Set the states of all the pluggable ports to be disabled.

Step 808: Set the number of the pluggable ports allowed to be enabled as 0, and set the number of the pluggable ports have been enabled as 0.

Step 809: Respectively store the serial number of the interface board, the set password and the number N of the pluggable ports that can be controlled by the password into the manufacture database.

In addition, the procedure of setting multiple passwords for one pluggable port can be the same as the that shown in FIG. 5, just more than one password set for each pluggable port; the manner only increases the data quantity to be stored without any improvement of security, so in general, the manner is not adopted.

Figure 9:
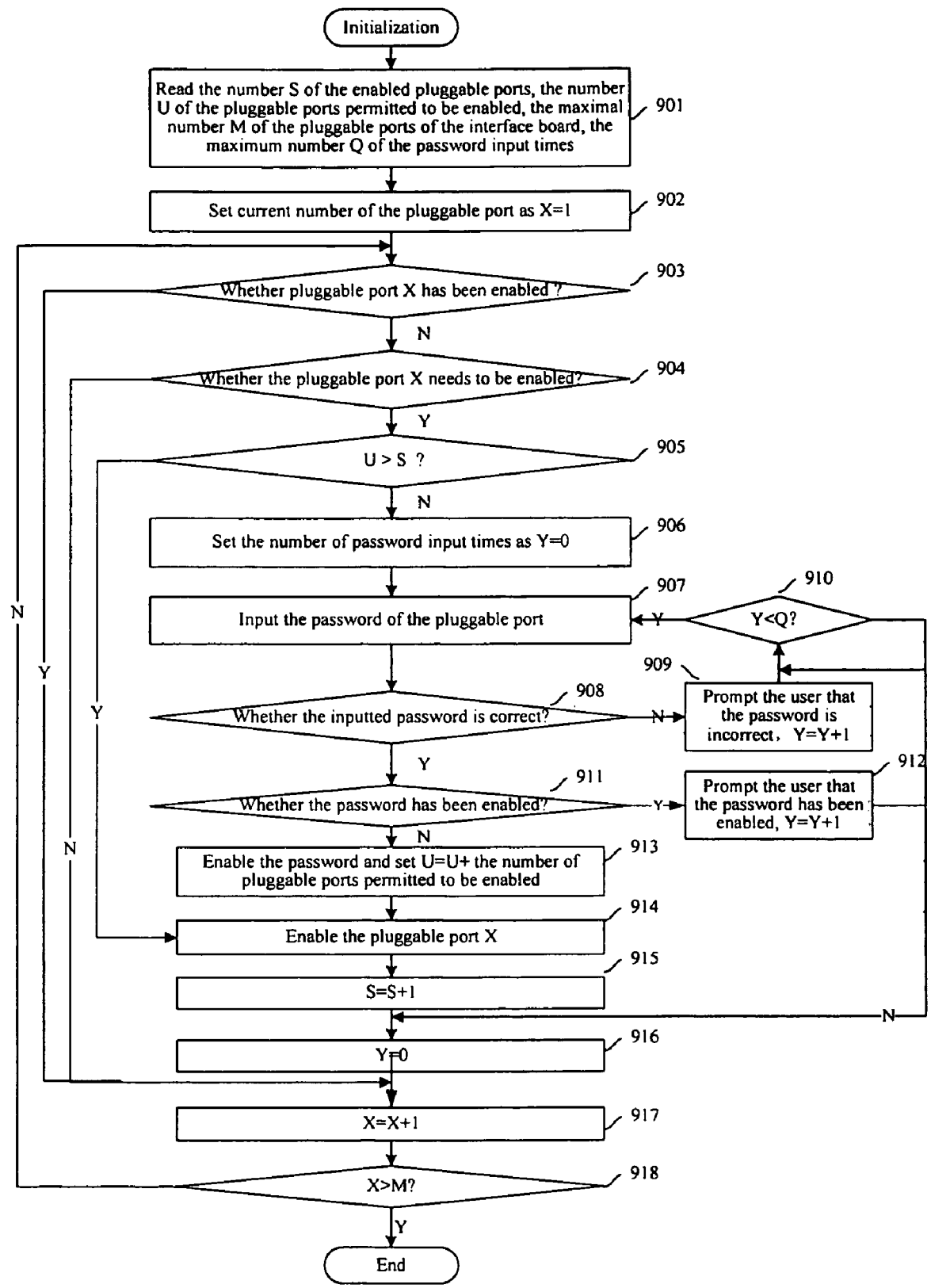
FIG. 9 is a flow chart illustrating a procedure of enabling the pluggable port of the interface board according to the embodiment shown in FIG. 8.

Then the procedure of enabling the pluggable port of the interface board will be illustrated. FIG. 9 is a flowchart illustrating the procedure of enabling the pluggable port of the interface board of the embodiment shown in FIG. 8. The procedure includes the following steps:

Step 901: After the electrifying or the resetting the interface board, respectively read a number S of the enabled pluggable ports, a number U of the pluggable ports allowed to be enabled, a maximum number M of the pluggable ports of the interface board and the maximum number Q of password input times.

Wherein, the number U of the pluggable ports permitted to be enabled denotes the total number of the pluggable ports can be enabled by all the passwords.

Step 902: Set the current number X of the pluggable port as X=1.

Step 903: Determine whether the pluggable port X is enabled, if it is enabled, go to step 917; otherwise, go to step 904.

Step 904: Determine whether the pluggable port X needs to be enabled, if it needs, go to step 905; otherwise, go to step 917.

Step 905: Determine whether the number U of the pluggable ports permitted to be enabled is larger than the number S of the enabled pluggable ports, if larger, go to step 914; otherwise, go to step 906.

Step 906: Set the number of the password input times as Y=0.

Step 907: Input the password of the pluggable port X.

Step 908: Determine whether the inputted password is correct according to the set password, if correct, go to step 911; otherwise, go to step 909.

Step 909: The system prompts that the password is incorrect and sets the number Y of the password input times as Y=Y+1, then goes to step 910.

Step 910: Determine whether the number Y of the password input times is less than the maximum number Q of password input times, if less, return to step 907 to input the password of the pluggable port X again; otherwise, go to step 916.

Step 911: Determine whether the password is enabled, if it is enabled, go to step 912 to prompt that the password has been enabled, and set the number Y of the password input times as Y=Y+1, then go step 910; otherwise, go to step 913.

Step 913: Enable the password, and set the number U of the pluggable ports permitted to enable as U=U+the number of the pluggable ports permitted to be enabled by the password, i.e. the number N of the pluggable ports can be controlled by the password.

Step 914: Enable the pluggable port X.

Step 915: Set the number S of the enabled pluggable ports as S=S+1.

Step 916: Set the number Y of the password input times as Y=0.

Step 917: Set the number X of the pluggable port as X+1, and go to step 918 to determine whether the pluggable port number is larger than the total number M of the pluggable ports of the interface board, if larger, end the procedure; otherwise, return to step 903.

Figure 10:
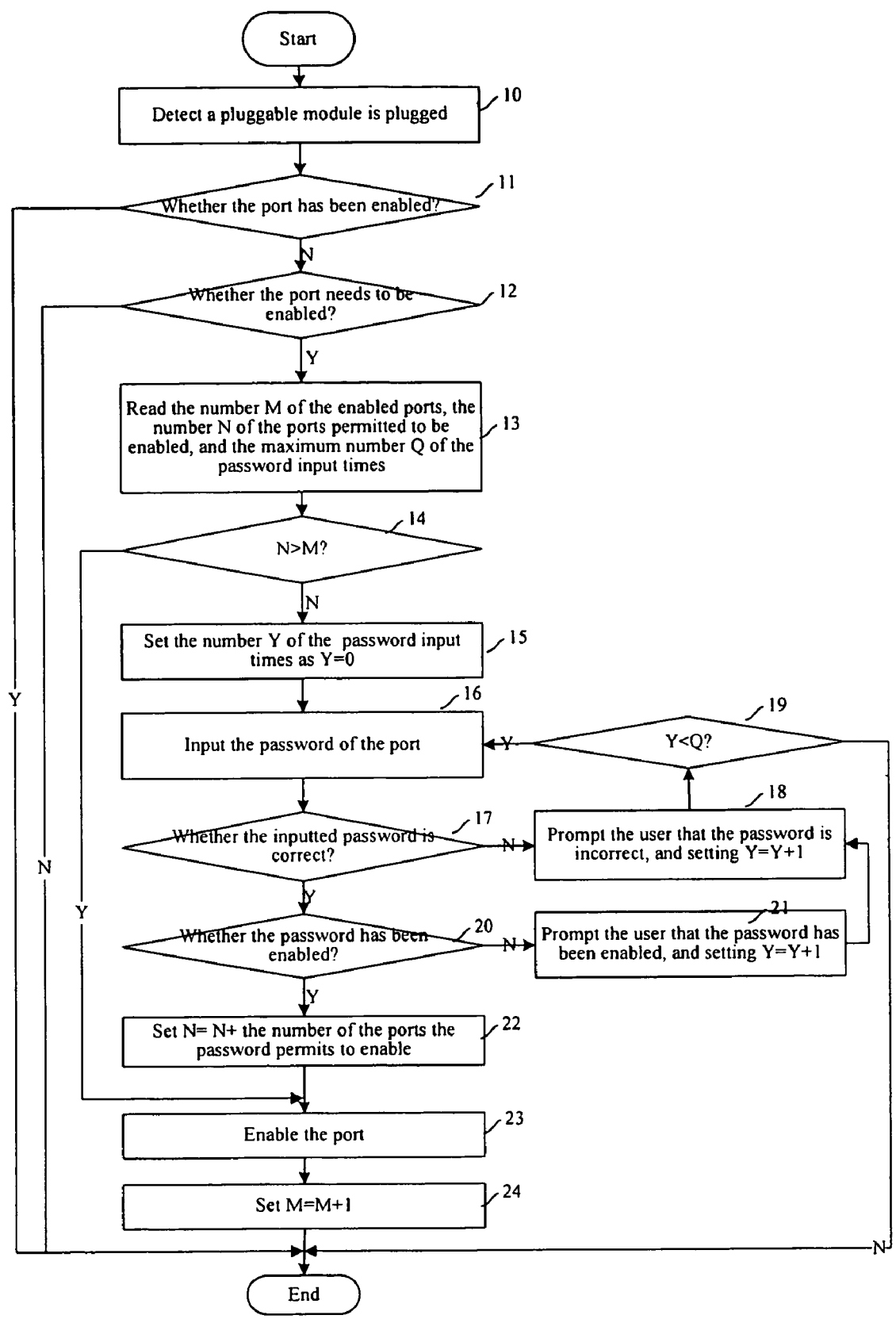
FIG. 10 is a flow chart illustrating a procedure when the interface board detects the pluggable module is plugged-in according to the embodiment shown in FIG. 8.

Then the control procedure when detecting that the pluggable module is plugged-in will be illustrated. Referring to FIG. 10, which is a control procedure when the interface board detects the pluggable module being plugged-in according to the embodiment shown in FIG. 8. The procedure includes the following steps:

Step 10: The interface board detects that the pluggable module is plugged-in.

Step 11: Determine whether the pluggable port is enabled, if it is enabled, end the procedure; otherwise, go to step 12.

Step 12: Determine whether to enable the pluggable port, if it is determined to enable, go to Step 13: Otherwise, end the procedure. Wherein, whether the pluggable port needs to be enabled can be determined according to the demand of service.

Step 13: Respectively read the number S of the enabled pluggable ports, the number U of the pluggable ports permitted to be enabled and the maximum number Q of password input times.

Step 14: Determine whether the number U of the pluggable ports permitted to enable is larger than the number S of the enabled pluggable ports, if larger, go to step 24; otherwise, go to step 15.

Step 15: Set the number Y of the password input times as Y=0.

Step 16: Input the password of the pluggable port. The procedure of inputting the password is the same as that in FIG. 6.

Step 17: Determine whether the inputted password is correct according to the set password of the pluggable port, if correct, go to step 20; otherwise, go to step 18.

Step 18: The system prompts that the password is incorrect and sets the number Y of the password input times as Y=Y+1, then goes to step 19.

Step 19: Determine whether the number Y of the password input times is less than the maximum number Q of password input times, if less, return to step 16 to input the password again; otherwise, end the procedure.

Step 20: Determine whether the password is enabled, if it is enabled, go to step 22; otherwise, go to step 23. The method for determining whether the password is enabled can be: determining whether the password verification has been implemented to the password.

Step 21: Prompt that the password is enabled, and set the number Y of the password input times as Y=Y+1, then return to step 19.

Step 22: Set the number U of the pluggable ports permitted to be enabled as U=U+the number of the pluggable ports permitted to be enabled by the password, i.e. the number N of the pluggable ports can be controlled by the password.

Step 23: Enable the pluggable port, and go to step 24, set the number S of the enabled pluggable ports as S=S+1, and then end the procedure.

Figure 11:
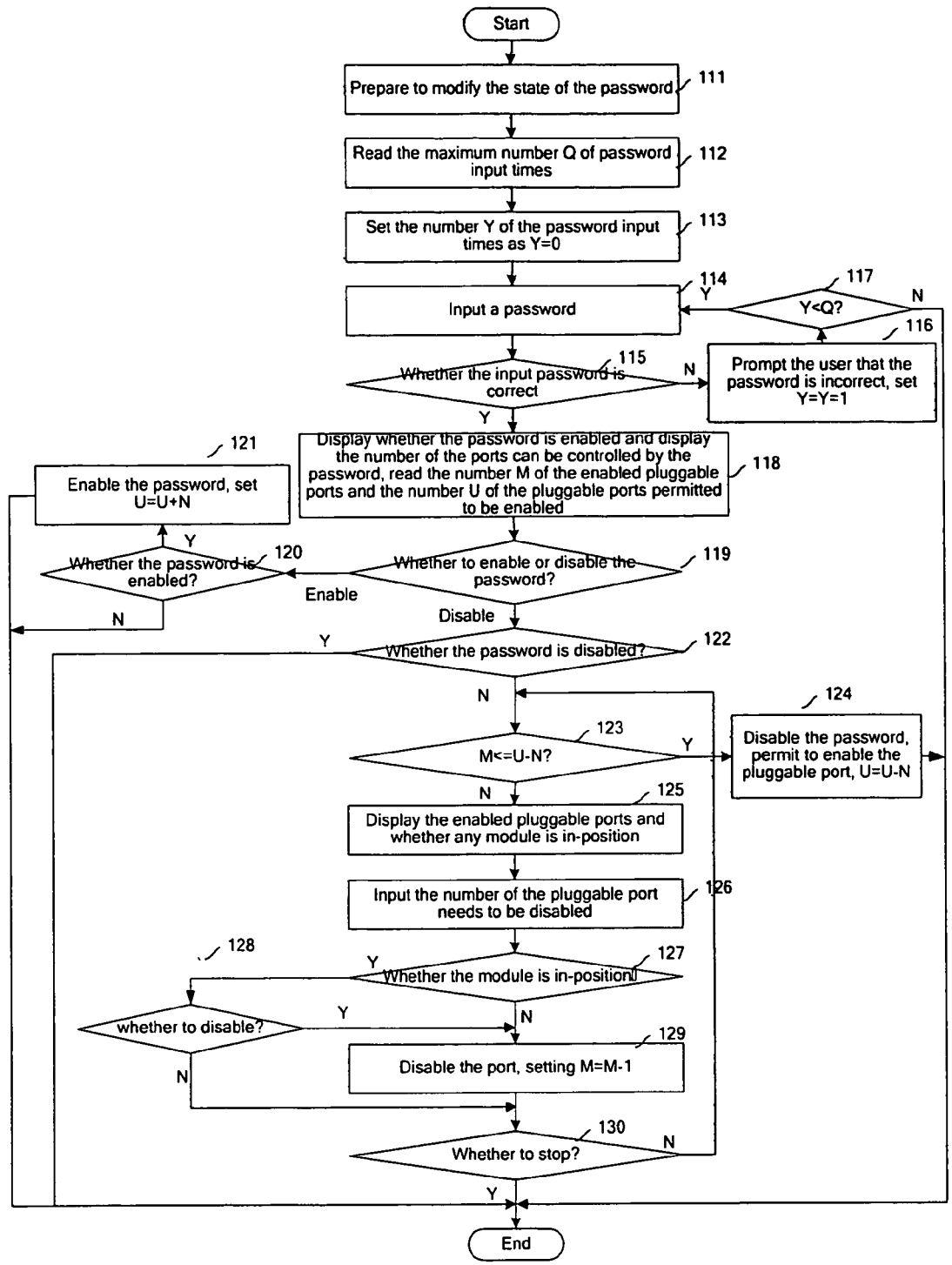
FIG. 11 is a flow chat illustrating a procedure of modifying the number of the pluggable ports that the password allows to enable according to the embodiment shown in FIG. 8.

At last, the procedure of modifying the number of the pluggable ports that the password permits to enable. Referring to FIG. 11, FIG. 11 is a flow chart illustrating the procedure of modifying the number of the pluggable ports that the password permits to enable as in the embodiment shown in FIG. 8. The procedure includes the following steps:

Step 111: Prepare to modify the state of the pluggable port, the user can select the pluggable port whose password state needs to be modified through the input/output device of the system control board.

Step 112: Read the corresponding maximum number Q of password input times of the password.

Step 113: Set the number Y of the password input times as Y=0.

Step 114: Input the password of pluggable port.

Step 115: Determine whether the inputted password is correct according to the pre-set password, if correct, go to step 118; otherwise, go to step 116.

Step 116: The system prompts that the password is incorrect, and sets the number Y of the password input times as Y=Y+1.

Step 117: Determine whether the number Y of the password input times is less than the maximum number Q of password input times, if less, return to step 114 to input the password again; otherwise, end the procedure.

Step 118: Display whether the password is enabled and display the number N of the pluggable ports can be controlled by the password, read the number M of the enabled pluggable ports and the number of the pluggable ports permitted to enable, then go to step 119.

Step 119: Determine whether to enable or disable the password, if the password needs to be enabled, go to step 120; otherwise, go to step 122.

Step 120: Determine whether the password is enabled, if it is enabled, end the procedure; otherwise, go to step 121.

Step 121: Enable the password, and set the number U of the pluggable ports permitted to be enabled as U=U+N, wherein N is the number of the pluggable ports which can be controlled by the password, then end the procedure.

Step 122: Determine whether the password is disabled, if it is disabled, end the procedure; otherwise, go to step 123.

Step 123: Determine whether the number of the enabled pluggable ports is less than or equal to the difference between the number U of the pluggable ports permitted to enable and the number of the pluggable ports can be controlled by the password, if it is less than or equal to the difference, go to step 124; otherwise, go to step 125.

Step 124: Disable the password, and permit to enable the pluggable port, then set the number U of the pluggable ports permitted to be enabled as U=U−N and end the procedure.

Step 125: Display the enabled pluggable ports and whether any pluggable module is in-position, the go to step 126.

Step 126: Input the port number of the pluggable ports that need to be disabled, then go to step 127;

Step 127: Determine whether any pluggable module is in-position on the pluggable port, if a pluggable module is in-position on the pluggable port, go to step 128; otherwise, go to step 129;

Step 128: Determine whether the pluggable port needs to be disabled, if it needs, go to step 129; otherwise, go to step 130;

Step 129: Disable the pluggable port, and set the number M of the enabled pluggable ports as M=M−1;

Step 130: Determine whether a user command of stop setting is received, if it is received, end the procedure; otherwise, return to step 123.

The procedure of setting the pluggable ports in the embodiment can be the same as that in the first preferable embodiment, which will not be repeated herein.

In both of the two embodiments, passwords are stored in the interface board and verification is implemented by the CPU module of the interface board. In practical applications, the passwords can also be stored in the system control board of the communication device, the system control board implements the verification and sends the verification result to the CPU of the interface board, and the CPU controls the logical control unit to enable or disable the pluggable ports. Of course, the method will increase the load of the system control board; so generally, the passwords are stored in the interface board.

In the above-mentioned two embodiments, the procedure of setting the states of the pluggable ports on the interface board to be enabled or disabled is implemented through controlling the high or low level voltage of the transmitter shutdown signal by the logical control unit of the interface board.

If the password storage and the password verification are implemented by the interface board, the detailed control procedure is: the CPU of the interface board verifies the password, and sends the command of enabling or disabling the pluggable port to the logical control unit according to the verification result, or sends the required state for enabling or disabling the pluggable port to the logical control unit. The logical control unit controls the transmitter shutdown signal as valid or invalid, i.e. controls the voltage level of the signal to be high or low, according to the received command or state information.

If the password storage and the password verification are implemented by the system control board, the detailed control process is: the system control board verifies the password, and sends the verification result to the CPU of the interface board, the CPU sends the command of enabling or disabling the pluggable port to the logical control unit according to the verification result, or sends the required state for enabling or disabling the pluggable port to the logical control unit, and the logical control unit controls the transmitter shutdown signal as valid or invalid, i.e. controls the voltage level of the signal to be high or low, according to the received command or state information.

The Third Preferable Embodiment:

This embodiment adopts the second implementation method as mentioned above. The control procedure of the embodiment is basically the same as that of the first and the second preferable embodiments, and the difference is: in the first and second preferable embodiments, the pluggable ports are controlled through setting the input voltage level of the transmitter shutdown control by the logical control unit; while in this embodiment, the pluggable ports are controlled through controlling the switches by the logical control unit. Thereby the control procedure will not be repeated herein, and hereinafter the hardware of the present embodiment will be described in detail.

In this embodiment, at least one switch used for enabling or disabling the pluggable port is added to the interface board; the above-mentioned switch(es) is(are) set on at least one kind of port line connecting with the pluggable module.

Figure 12:
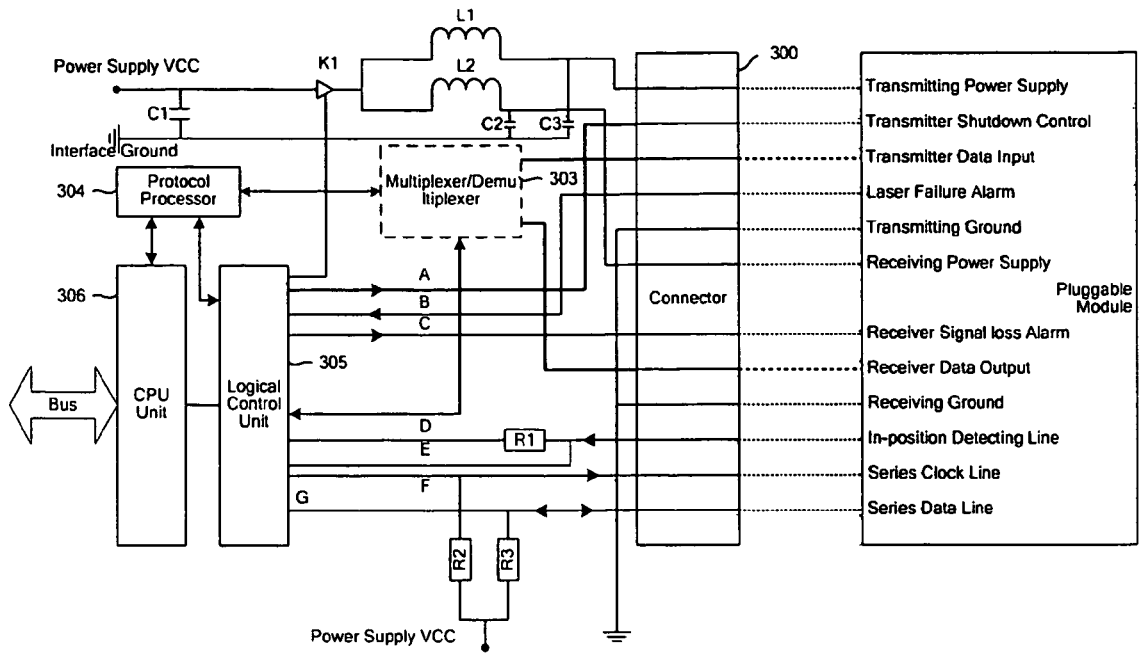
FIG. 12 is a structural diagram illustrating a circuit of a first kind of pluggable ports according to a third preferable embodiment of the present invention.
Figure 13:
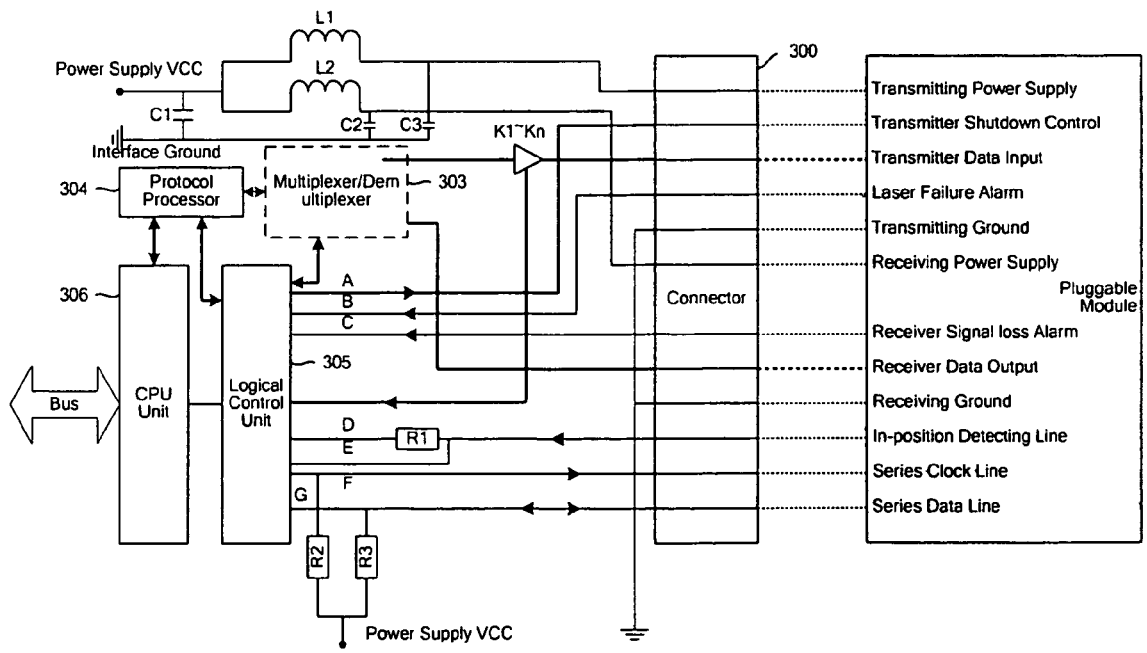
FIG. 13 is a structural diagram illustrating a circuit of a second kind of pluggable ports according to the third preferable embodiment of the present invention.
Figure 14:
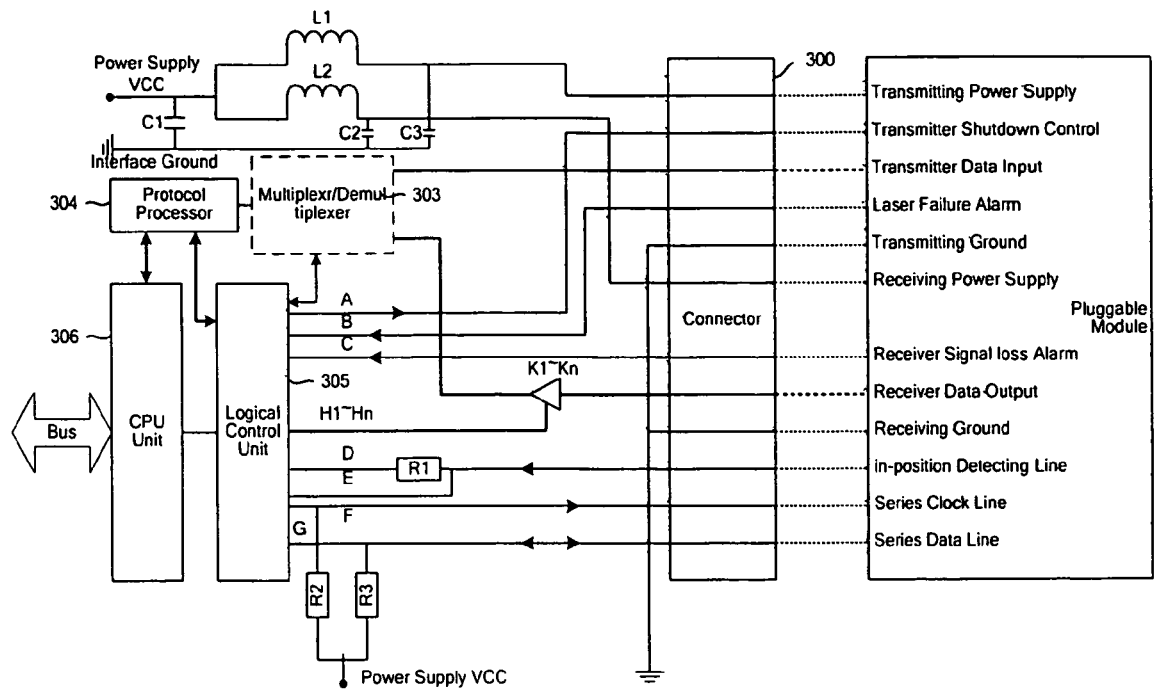
FIG. 14 is a structural diagram illustrating a circuit of a third kind of pluggable ports according to the third preferable embodiment of the present invention.

For example, as shown in FIG. 12, setting the switch K1 on the power line connecting with the pluggable module; or as shown in FIG. 13, setting a multi-line switch K1~Kn on the transmitter data input lines connecting with the pluggable module; or as shown in FIG. 14, setting a multi-line switch K1~Kn on the receiver data output lines connecting with the pluggable module.

In the structure diagrams of the circuits of the pluggable ports shown in FIG. 12, FIG. 13 and FIG. 14 are the same except for the position of the switches. Specifically:

Wherein, the memorizer stores the pre-set password of the pluggable port.

The CPU receives the external inputted password from the system control board, implements password verification by the passwords stored in the memorizer, and sends the command of enabling or disabling the pluggable port of the interface board to the logical control unit according to the verification result.

The logical control unit controls the switches to be on or off according to the command from the CPU.

Figure 1:
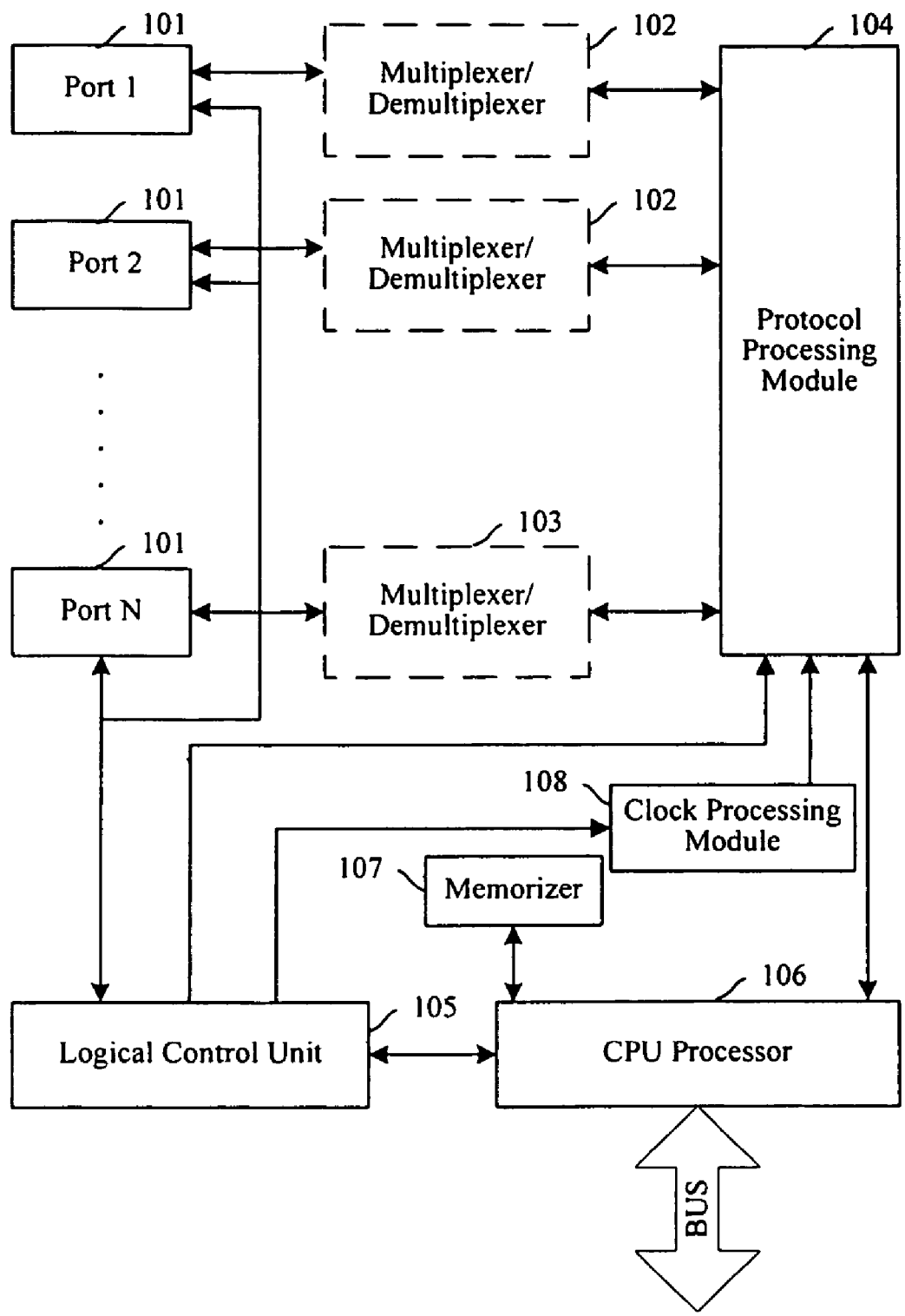
FIG. 1 is a structural schematic diagram illustrating an interface board according to the related art.
Figure 2:
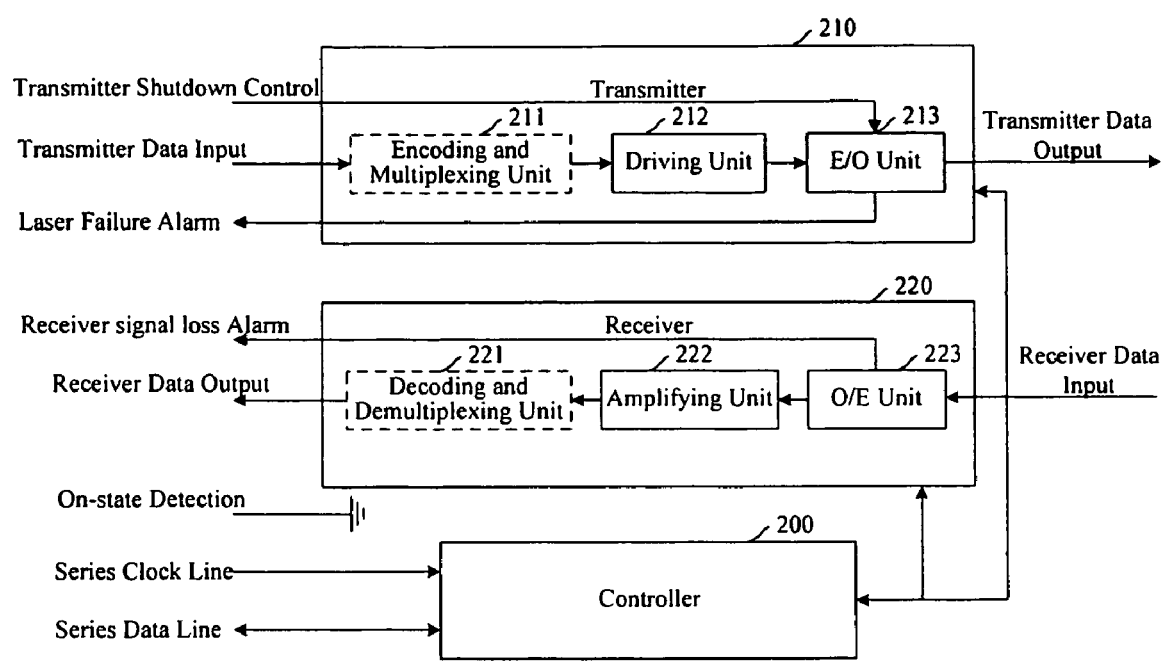
FIG. 2 is a structural schematic diagram illustrating internal functions of a pluggable module.
Figure 3:
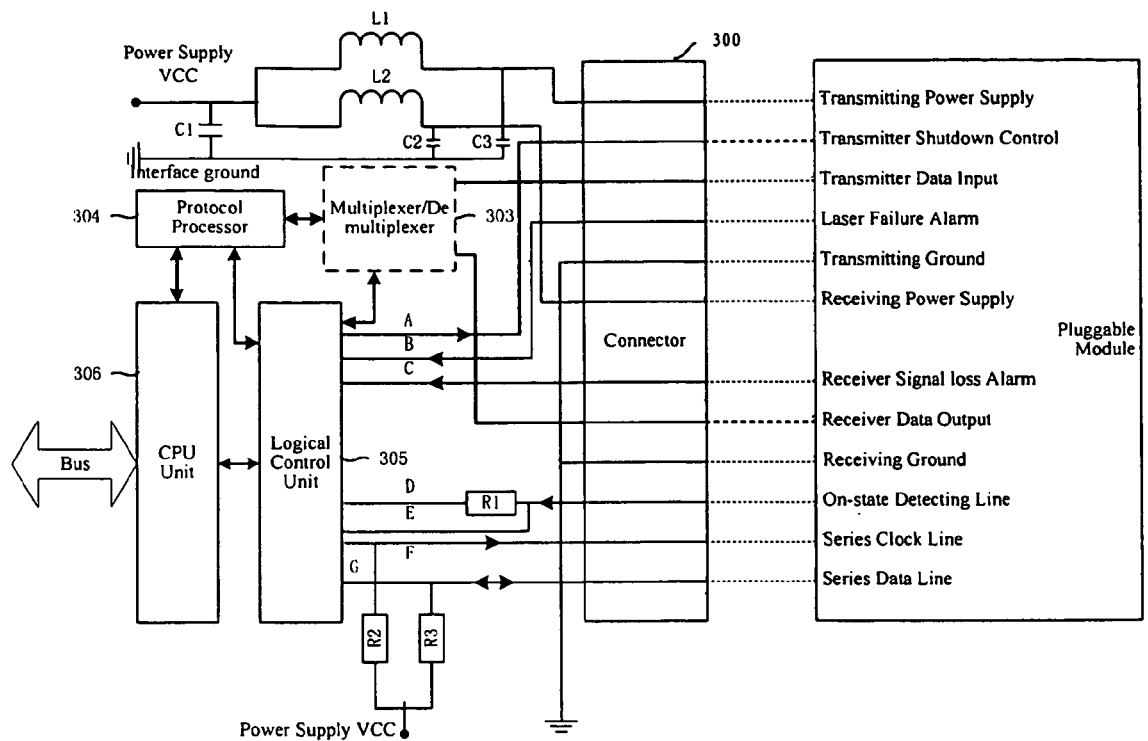
FIG. 3 is a diagram illustrating a typical circuit structure of a pluggable port on an interface board according to the related art.
Figure 4:
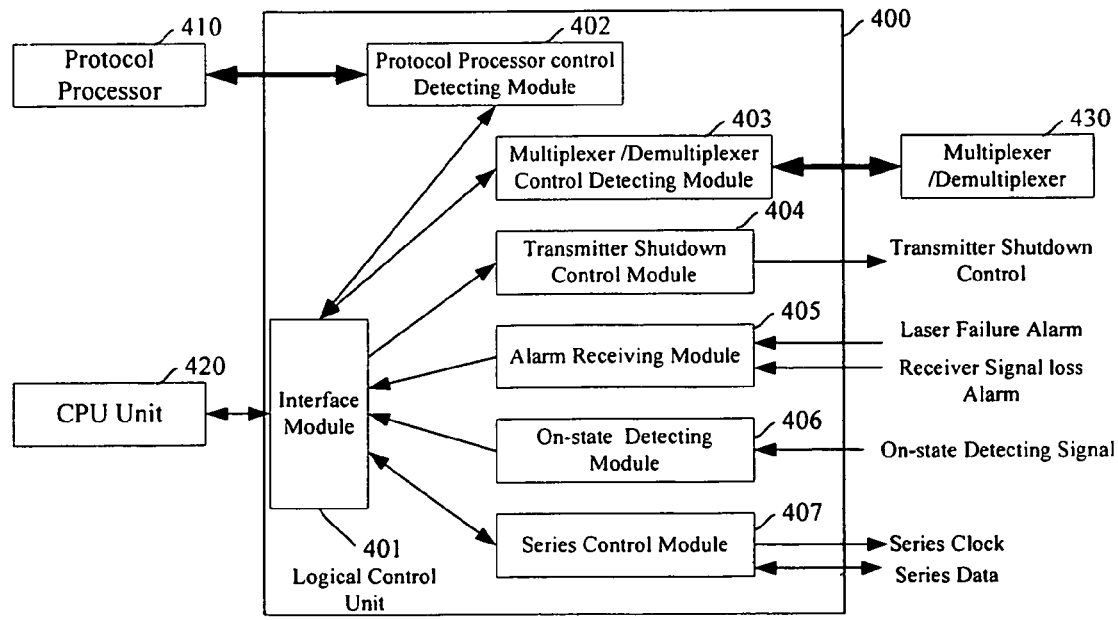
FIG. 4 is a schematic diagram illustrating a functional structure and connective relationship of a logical control unit according to the related art.
Figure 15:
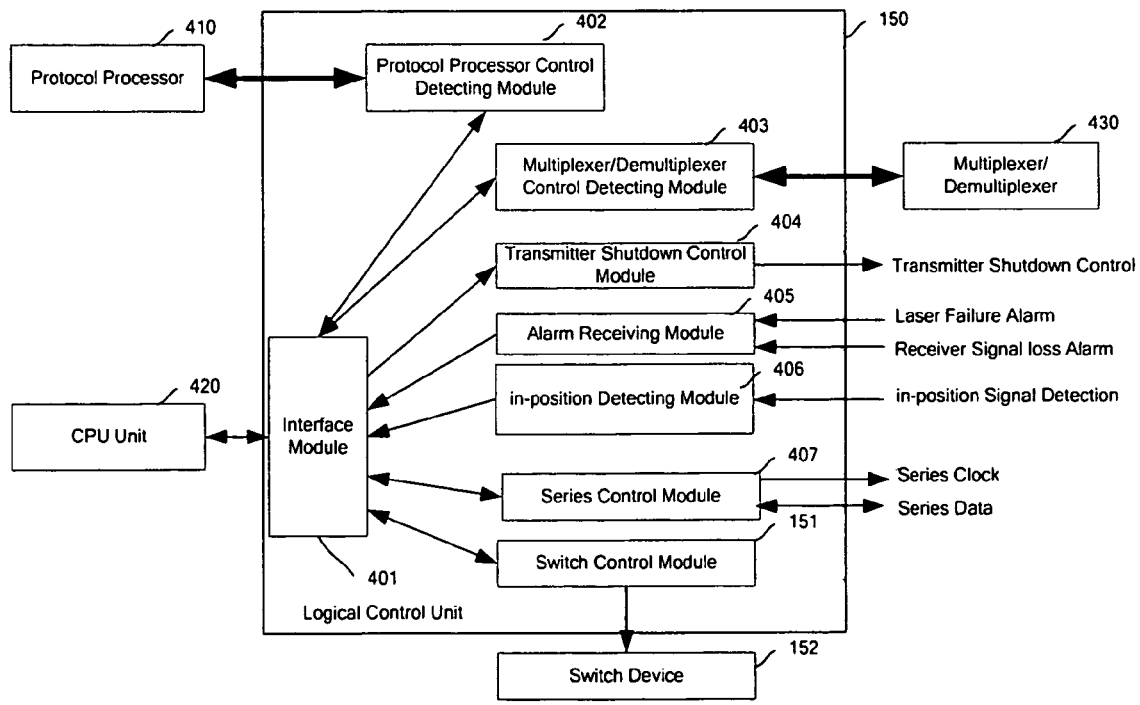
FIG. 15 is a schematic diagram illustrating a functional structure and connective relationship of a logical control unit according to the third preferable embodiment of the present invention.

In FIG. 13, the switch(es) on the transmitter data input lines are single-line switches or is a multi-line switch, and the number of lines of the switch is the same as that of the input signals of the transmitter. Likewise in FIG. 14, the switch(es) on the receiver data output line are single-line switches or is a multi-line switch, and the number of lines of the switch is the same as that of the output signals of the receiver;

Referring to FIG. 15, FIG. 15 is a schematic diagram illustrating the functional structure and the connective relation of the logical control unit according to the third preferable embodiment of the present invention. Comparing FIG. 15 with FIG. 4, it is obvious that in the embodiment, a switch control module 151 is added to the logical control unit 150, and the switch control module 151 is directly connected to the interface module 401.

The interface module 401 determines which functional module the commands are to be sent after receiving the commands from the CPU, and transmits the command used for controlling the switches wherein to the switch control module 151.

The switch control module 151 controls the Switch Device 152 to be on or off according to the received command.

In can be seen from FIG. 15, the modification on the logical control unit of the present embodiment is relatively small, and the added switch control module 151 has no relation and conflict with the other functional modules, therefore the cost of the present embodiment is low and the present embodiment is easy to implement.

It can be seen from the embodiments, the method for controlling the pluggable port of the interface board of the communication device and the interface board in present invention can better prevent the pluggable port from being falsely or illegally used, thereby avoiding the instability and unreliability of the communication device and the communication network resulting from the false or illegal use, and guarantees the normal operation of the communication device and communication network.

The present invention has been illustrated and described with the accompanying preferable embodiments, but various changes of equivalent parts on form and detail can be made without departing from the spirit and the scope of the present invention.

What is claimed is:

1. A method for controlling one or more pluggable ports of an interface board of a communication device, the method comprising:
   presetting a password for at least a first pluggable port of the interface board;
   storing the preset password for the first pluggable port;
   detecting, during working hours of the communication device, that a pluggable module for the first pluggable port is in position at the first pluggable port of the interface board;
   determining, if the pluggable module is in position at the first pluggable port of the interface board, whether a state of the first pluggable port is enabled, if the state is not enabled, causing the communication device to await receipt of an externally input password;
   verifying, upon receipt of the externally input password, the received password with respect to the stored password for the first pluggable port; wherein verifying the received password further comprises:
   a system control board of the communication device prompting a user to input the externally input password through an output device connecting with the system control board;
   the system control board of the communication device receiving the externally input password from the user through an input device connecting with the system control board and transmitting the externally input password to the interface board; and
   the interface board verifying the received externally input password with respect to the stored password for the first pluggable port;
      enabling or disabling the first pluggable port of the interface board according to the verification result, wherein each of the one or more pluggable ports has a port number, and
   storing each port number associated with the one or more pluggable ports and a corresponding preset password in the interface board.

2. The method according to claim 1, wherein the verification of the password is implemented by a Central Processing unit (CPU) of the interface board.

3. The method according to claim 1, wherein each of the one or more pluggable ports has a port number, and
   wherein the method further comprises: storing each pluggable port number and a corresponding preset password, as well as a sequence number of the interface board, into a system control board of the communication device; and wherein the step of verifying the received password comprises:

the system control board of the communication device prompting a user, through an output device connecting with the system control board, to input the externally input password; and the system control board of the communication device verifying the received password with respect to the stored password for the first pluggable port, and transmitting a verification result to a CPU of the interface board.

4. The method according to claim 2, wherein the step of enabling or disabling the first pluggable port of the interface board according to the verification result comprises:

the CPU of the interface board sending a command to enable or disable the first pluggable port of the interface board to a logical control unit of the interface board according to the verification result; and the logical control unit enabling or disabling the first pluggable port according to the command from the CPU.

5. The method according to claim 3, wherein the step of enabling or disabling the first pluggable port of the interface board according to the verification result comprises:

the CPU of the interface board sending a command to enable or disable the first pluggable port of the interface board to a logical control unit of the interface board according to the verification result; and the logical control unit enabling or disabling the first pluggable port according to the command from the CPU.

6. The method according to claim 4, wherein the step of the logical control unit enabling or disabling the first pluggable port comprises:

the logical control unit setting a transmitter shutdown control signal as valid or invalid according to the command from the CPU.

7. The method according to claim 5, wherein the step of the logical control unit enabling or disabling the first pluggable port comprises:

the logical control unit setting a transmitter shutdown control signal as valid or invalid according to the command from the CPU.

8. The method according to claim 4, further comprising:

setting a switch on at least one of a power line, transmitter data input lines, and receiver data output lines of a circuit of the first pluggable port of the interface board;

wherein the step of the logical control unit enabling or disabling the first pluggable port comprises: the logical control unit setting the switch on or off according to the command from the CPU.

9. The method according to claim 5, further comprising:

setting a switch on at least one of a power line, transmitter data input lines, and receiver data output lines of a circuit of the first pluggable port of the interface board;

wherein the step of the logical control unit enabling or disabling the first pluggable port comprises: the logical control unit setting the switch on or off according to the command from the CPU.

10. The method according to claim 1, wherein the step of verifying the received password comprises:

comparing the received password with the stored password for the first pluggable port, and determining whether the received password is identical to the stored password for the first pluggable port, if they are identical, the verification is passed; otherwise, the verification is not passed.

11. The method according to claim 2, wherein the step of verifying the received password comprises:

comparing the received password with the stored password for the first pluggable port, and determining whether the received password is identical to the stored password for the first pluggable port, if they are identical, the verification is passed; otherwise, the verification is not passed.

12. The method according to claim 3, wherein the step of verifying the received password comprises:

comparing the received password with the stored password for the first pluggable port, and determining whether the received password is identical to the stored password, if they are identical, the verification is passed; otherwise, the verification is not passed.

13. The method according to claim 1, further comprising:

pre-configuring a number of password input times and storing the number of the password input times together with the preset password for the first pluggable port; and wherein the step of enabling or disabling the first pluggable port of the interface board according to the verification result comprises:

when the password verification is not passed, recording a number of the password input times and determining whether the number of the password input times reaches the pre-configured number of password input times, if it reaches the pre-configured number of password input times, disabling the first pluggable port of the interface board; otherwise, causing the communication device to await receipt of a next externally input password.

14. The method according to claim 2, further comprising:

pre-configuring a number of password input times and storing the number of password input times together with the preset password for the first pluggable port; and wherein the step of enabling or disabling the first pluggable port of the interface board according to the verification result comprises;

when the password verification is not passed, recording a number of the password input times and determining whether the number of the password input times reaches the pre-configured number of password input times, if it reaches the pre-configured number of password input times, disabling the first pluggable port of the interface board; otherwise, causing the communication device to await receipt of a next externally input password.

15. The method according to claim 3, further comprising:

pre-configuring a number of password input times and storing the number of password input times together with the preset password for the first pluggable port; and wherein the step of the communication device enabling or disabling the first pluggable port of the interface board according to the verification result comprises:

when the password verification is not passed, recording a number of the password input times and determining whether the number of the password input times reaches the pre-configured number of password input times, if it reaches the pre-configured number of password input times, disabling the first pluggable port of the interface board;

otherwise, causing the communication device to await receipt of a next externally input password.

16. A method for controlling one or more pluggable ports of an interface board of a communication device, the method comprising:

presetting a password for at least a first pluggable port of the interface board;

storing the preset password for the first pluggable port;

detecting, during working hours of the communication device, that a pluggable module for the first pluggable port is in position at the first pluggable port of the interface board;

determining, if the pluggable port is in position at the first pluggable port of the interface board, whether a state of the first pluggable port is enable, if the state is not enabled, causing the communication device to await receipt of an externally input password;

verifying, upon receipt of the externally input password, the received password with respect to the stored password for the first pluggable port; wherein verifying the received password further comprises;

prompting, through a communicatively coupled output device and a system control board position in communication with the communication device, for the externally input password;

receiving the prompted externally input password through a communicatively coupled input device and the system control board;

communicating the externally input password to the interface board, and verifying the communicated externally input password with respect to the stored password for the first pluggable port;

enabling or disabling the first pluggable port of the interface board according to the verification result, wherein each of the one or more pluggable ports has a port number, and storing each port number associated with the one or more pluggable ports, and a corresponding preset password in the interface board.

\* \* \* \* \*

UNITED STATES PATENT AND TRADEMARK OFFICE
CERTIFICATE OF CORRECTION

| | | |
|---|---|---|
| PATENT NO. | : 7,779,266 B2 | Page 1 of 1 |
| APPLICATION NO. | : 11/527172 | |
| DATED | : August 17, 2010 | |
| INVENTOR(S) | : Changzheng Su | |

It is certified that error appears in the above-identified patent and that said Letters Patent is hereby corrected as shown below:

In column 17, claim 16, line 8, after "the pluggable" replace "port" with --module--.

In column 17, claim 16, line 10, after "pluggable port is" replace "enable," with --enabled,--.

In column 17, claim 16, line 18, after "system control board" replace "position" with --portion--.

Signed and Sealed this
First Day of May, 2012

David J. Kappos
*Director of the United States Patent and Trademark Office*